United States Patent
Kobayashi et al.

(10) Patent No.: US 7,380,856 B2
(45) Date of Patent: Jun. 3, 2008

(54) VEHICLE BODY REAR STRUCTURE OF AUTOMOBILE

(75) Inventors: Akira Kobayashi, Hamamatsu (JP); Takanori Tsukakoshi, Hamamatsu (JP)

(73) Assignee: Suzuki Motor Corporation (JP)

( * ) Notice: Subject to any disclaimer, the term of this patent is extended or adjusted under 35 U.S.C. 154(b) by 494 days.

(21) Appl. No.: 11/223,274

(22) Filed: Sep. 9, 2005

(65) Prior Publication Data

US 2006/0087156 A1    Apr. 27, 2006

(30) Foreign Application Priority Data

Sep. 21, 2004   (JP) .............................. 2004-273266

(51) Int. Cl.
*B60N 99/00* (2006.01)

(52) U.S. Cl. ............... 296/37.2; 296/37.3; 296/193.07; 296/193.08

(58) Field of Classification Search ............... 296/37.2, 296/37.3, 193.07, 193.08; 224/42.12–42.3
See application file for complete search history.

(56) References Cited

U.S. PATENT DOCUMENTS

| | | | |
|---|---|---|---|
| 1,403,881 A * | 1/1922 | Whitton | 296/37.2 |
| 6,206,461 B1 | 3/2001 | Gaiser | |
| 6,336,671 B1 * | 1/2002 | Leonardi | 296/37.3 |
| 2006/0119125 A1 * | 6/2006 | Muthigi et al. | 296/37.2 |

FOREIGN PATENT DOCUMENTS

| | | |
|---|---|---|
| DE | 19829432 C2 | 7/2003 |
| JP | 62-43875 | 3/1987 |
| JP | 11-011359 | 1/1999 |
| JP | 2002-321642 | 11/2002 |

OTHER PUBLICATIONS

German Office Action corresponding to German Application No. 10-2005-044-907.7-42 dated Feb. 13, 2007.

* cited by examiner

*Primary Examiner*—Lori L Lyjak
(74) *Attorney, Agent, or Firm*—Myers Bigel Sibley & Sajovec, PA

(57) ABSTRACT

There is provided a vehicle body rear structure of an automobile, which can deal with all of a load from a towing hook, a load from a jack-up point, a load from the rear of vehicle body, and a load from a seat belt anchor, though having a simple construction that does not bring about an increase in the number of parts and an increase in weight of vehicle body. A load distributing member 7 extending along the body longitudinal direction is assembled to a spare tire house 6 so as to trail over a lower surface 6a of the spare tire house 6; and a front end portion α of the load distributing member 7 is joined to a cross member 4, and a rear end portion β thereof is joined to the back panel 3 (located on the rear side of the cross member 4).

6 Claims, 5 Drawing Sheets

VEHICLE BODY REAR STRUCTURE OF AUTOMOBILE

RELATED APPLICATION

This application claims priority from Japanese Patent Application No. 2004-273266; filed Sep. 21, 2004, the disclosure of which is incorporated by reference herein in its entirety.

FIELD OF THE INVENTION AND RELATED ART STATEMENT

The present invention relates to a vehicle body rear structure of an automobile, in which a spare tire house (spare tire housing) is provided to house a spare tire.

Loads which can occur in the vicinity of a spare tire house provided in a vehicle body rear part of an automobile include a load from a towing hook, a load from a jack-up point, a load from the rear of a vehicle body, and a load from a seat belt anchor.

Against these loads, there is usually no member in the vicinity of the spare tire house capable of securing rigidity and strength. Conventionally, therefore, to locally secure rigidity around the spare tire house to deal with the above-described loads, individual measures have been taken; for example, a patch is additionally provided to increase the rigidity, or a bracket for increasing the rigidity is additionally provided on a member around the spare tire house. Also, because the amount of spare tire house deformation is large against a load from the rear of the vehicle body, measures thereagainst have included an additionally-provided patch or increased body panel sheet thickness.

Specific conventional measures against each of these loads will now be described. First, in the case where a towing hook is attached to a lower part of spare tire house, reinforcement has been provided by installing a patch around the hook attaching portion of the spare tire house to withstand a towing load. In the case where a jack-up point is provided under the spare tire house, reinforcement has been provided by installing a patch around the jack-up point of the spare tire house to withstand the load when jacking-up. Also, as measures against a load from the rear of the vehicle body, a construction has been provided such that a load transmitted from a rear bumper to a cross member (provided between a pair of right and left rear side members) is withstood by only the rear side members. Therefore, the burden imposed on the rear side member is increased by extensive deformation of the spare tire house. Also, the load from a seat belt anchor attached to the cross member is sustained by the cross member and is transmitted to the rear side members. In this case, since the cross member has a beam construction in which both ends of the cross member are fixed to the paired right and left rear side members, in order to transmit the load, it is necessary to secure rigidity to such a degree that the cross member is not deformed. Therefore, the cross-sectional area of cross member has been increased, or the sheet thickness thereof has been increased.

Therefore, in the related art, securing rigidity to such a degree as to be capable of sustaining various kinds of loads results in an increase in the number of parts due to the use of a patch etc. or an increase in the weight of vehicle body due to the increase in sheet thickness.

In the above-described situation, certain measures have been proposed to solve the above problems. For example, in Japanese Patent Provisional Publication No. 11-11359, there has been proposed "a vehicle body rear structure in which a load transmitting member for directly transmitting a load to a wheel portion of a spare tire is installed so as to extend in the body longitudinal direction between an intermediate portion and a rear end portion in the body longitudinal direction of spare tire house, and a towing hook is installed in a rear end portion thereof". According to this structure, a load applied to the towing hook (in the case where the towing hook is also used as a jack-up point, the towing hook and the jack-up point) can be sustained.

Also, in Japanese Utility Model Provisional Publication No. 62-43875, there has been proposed "a vehicle body rear structure in which a center frame is fixedly joined to a lower surface of a spare tire house formed on a rear floor panel so as to substantially coincide with the body centerline; a front end portion of the center frame is fixedly joined to a substantially central portion in the vehicle width direction of a cross member provided between a pair of right and rear left rear side members; a reinforcement is installed between an intermediate portion in the body longitudinal direction of the center frame and the rear side member; and further a towing hook is installed in a rear end portion of the center frame". According to this structure, a load from the rear can be sustained by the center frame.

Also, in Japanese Patent Provisional Publication No. 2002-321642, there has been proposed "a vehicle body rear structure in which a subcenter member provided between a cross member and a back panel (rear skirt) is arranged above a spare tire house, and the subcenter member has a shape such as to press a spare tire in the spare tire house approximately downward when an excessive load is applied from the rear side of vehicle". According to this structure, the load from the rear can be sustained by the subcenter member.

However, in the structure described in Japanese Patent Provisional Publication No. 11-11359, although the loads from the towing hook and the jack-up point can be dealt with as described above, the spare tire house may be deformed by a load from the rear of the vehicle body because the structure is such that the load from the rear of the vehicle body is sustained by the spare tire house. Therefore, there arises a problem in that if an excessive load is applied from the rear of the vehicle body, the load cannot be absorbed sufficiently. Also, this structure is such that the load from a seat belt anchor is not at all considered.

Also, in the structure described in Japanese Utility Model Provisional Publication No. 62-43875, although the load from the rear of vehicle body can be dealt with as described above, the center frame and the spare tire house may be deformed because the center frame is cantilevered with the center of a spare tire being a supporting point. Also, as a measure against the load from a seat belt anchor, its strength is insufficient because the structure is such that a load which pulls the center frame toward the front of vehicle body is sustained only by a part in which the center of the spare tire serves as a supporting point. On the other hand, this structure can withstand a greater load than that in the case of the structure described in Japanese Patent Provisional Publication No. 11-11359, because a load received by the center frame can be transmitted to the cross member. However, when the center frame moves toward the front of the vehicle body while being deformed due to a load from the rear of the vehicle body, the center frame hits the fuel tank, so that there is a fear of damaging the fuel tank.

Also, in the structure described in Japanese Patent Provisional Publication No. 2002-321642, although the load from the rear of vehicle body can be dealt with as described above, loads from the towing hook and the jack-up point cannot be dealt with because a reinforcing part is absent under the spare tire house. Also, as measures against the load from a seat belt anchor, it is necessary to provide the back panel (vehicle rear end member) with sufficient rigidity due to the increase in sheet thickness of the back panel or the additional provision of a reinforcing member to restrain the deformation of the back panel because the configuration is such that a load which pulls the subcenter member toward the front of the vehicle body is sustained by only the back panel, which leads to an increase in weight and an increase in the number of parts. On the other hand, this structure can withstand a greater load than that in the case of the structure described in Japanese Patent Provisional Publication No. 11-11359 because a load received by the subcenter member can be transmitted to the cross member. However, as in the case of Japanese Utility Model Provisional Publication No. 62-43875, there is a fear of damaging the fuel tank. Furthermore, this structure is inconvenient because the subcenter member is located above the spare tire and thus the spare tire can only be taken out of the lower side of a vehicle body.

Thus, while various vehicle body rear structures have conventionally been proposed to deal with the load applied to the vehicle body rear part, all have had merits and demerits. A vehicle body rear structure has been demanded which can deal with all of the above-described four kinds of loads (specifically, a load from a towing hook, a load from a jack-up point, a load from the rear of vehicle body, and a load from a seat belt anchor).

OBJECT AND SUMMARY OF THE INVENTION

The present invention has been made in view of the above circumstances, and accordingly an object thereof is to provide a vehicle body rear structure of an automobile, which can deal with all of a load from a towing hook, a load from a jack-up point, a load from the rear of vehicle body, and a load from a seat belt anchor though having a simple construction that does not bring about an increase in the number of parts or an increase in weight of vehicle body.

To achieve the above object, the present invention provides a vehicle body rear structure of an automobile, comprising a pair of rear side members extending substantially along the body longitudinal direction on both right and left sides of a vehicle body rear part; a back panel disposed on the rear end side of the paired rear side members; a cross member installed between the paired rear side members at a location in front of the back panel; a spare tire house bendedly formed on a rear floor panel at a location between the cross member and the back panel, wherein a load distributing member extending along the body longitudinal direction is assembled to the spare tire house so as to trail over a lower surface of the spare tire house; and a front end portion of the load distributing member is joined to the cross member, and a rear end portion thereof is joined to the back panel.

Also, in the present invention, the front and rear end portions of the load distributing member are connected to the rear floor panel.

Further, in the present invention, a towing hook is installed on the load distributing member.

Still further, in the present invention, a jack-up point is provided on the load distributing member.

Still further, in the present invention, the towing hook is also used as the jack-up point.

According to the present invention, the operation and effects described below can be achieved.

In the present invention, the load distributing member extending along the body longitudinal direction is assembled to the spare tire house so as to trail over the lower surface of the spare tire house; and the front end portion of the load distributing member is joined to the cross member, and the rear end portion thereof is joined to the back panel (located on the rear side of the cross member). Therefore, a load applied to the vehicle body rear part (for example, the load from the rear of vehicle body) can be distributed in the vehicle body rear part via the load distributing member, so that local concentration of load can be reduced. For this reason, according to the present invention, simply providing an additional load distributing member can achieve the necessary rigidity and strength, and the structure has a simple construction that does not bring about a significant increase in the number of parts and an increase in weight of vehicle body.

Also, in the present invention, the front and rear end portions of the load distributing member are connected to the rear floor panel. Therefore, by arranging the load distributing member so as extend from the spare tire house to the rear floor panel, the load from the rear of vehicle body can be distributed properly over a wide range of the vehicle body rear part via the load distributing member and the rear floor panel.

Further, in the present invention, the towing hook is installed on the load distributing member. Therefore, when a towing load is applied to the towing hook, the towing load at this time can be distributed over a wide range from the spare tire house to the rear floor panel, back panel, cross member, and rear side members, not merely to the load distributing member, so that the rigidity and strength of a towing hook attaching portion can be secured sufficiently.

Still further, in the present invention, the jack-up point is provided on the load distributing member. Therefore, a load applied to the jack-up point when jacking up can be distributed to the spare tire house, rear floor panel, cross member, back panel, and rear side members via the load distributing member. For this reason, the rigidity and strength of a jack-up point can be secured sufficiently.

Still further, in the present invention, the towing hook is also used as the jack-up point. Therefore, a load applied to the jack-up point at the time when the towing hook is jacked up by a jack can be distributed over a wide range from the spare tire house to the rear floor panel, cross member, and rear side members, not merely to the load distributing member. For this reason, the jack-up point can be secured without installing a patch for the jack-up point, and hence a simple construction that does not bring about an increase in the number of parts and an increase in weight of vehicle body can be realized.

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

DETAILED DESCRIPTION OF THE PREFERRED EMBODIMENTS

A vehicle body rear structure of an automobile in accordance with one embodiment of the present invention will now be described with reference to FIGS. 1 to 5.

Figure 1:
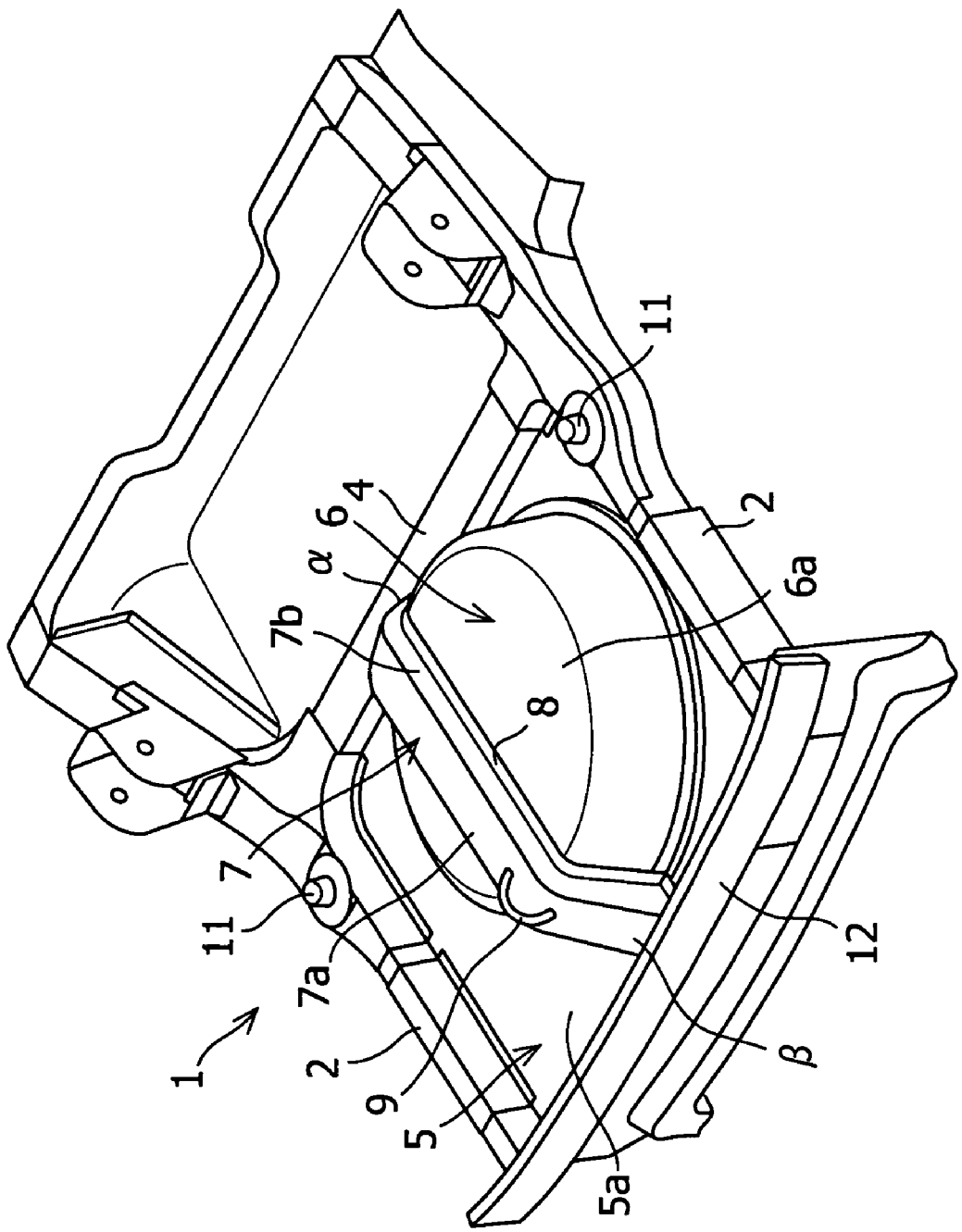
FIG. 1 is a perspective view of a vehicle body rear structure in accordance with one embodiment of the present invention, which is viewed from the downside.
Figure 2:
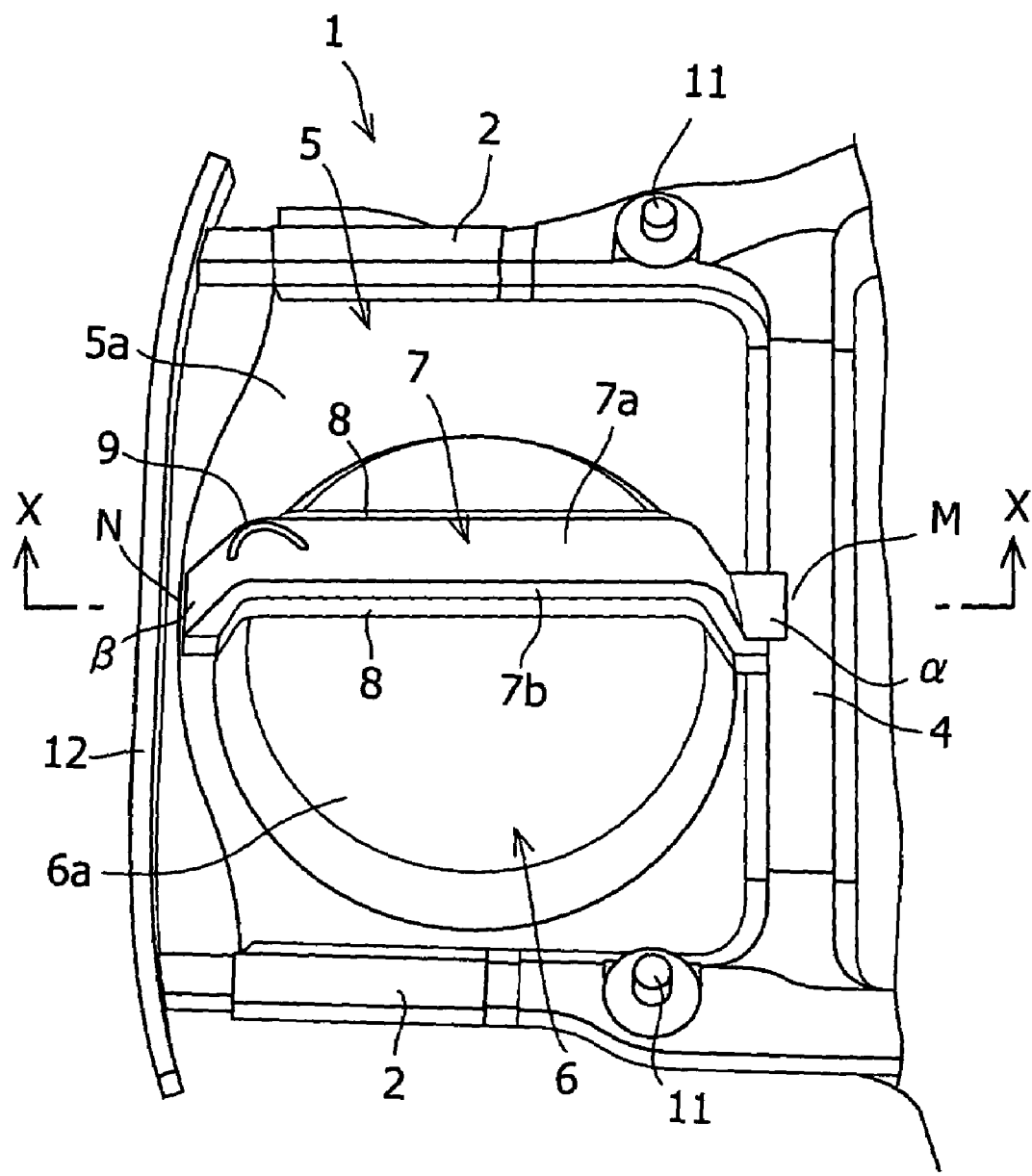
FIG. 2 is a perspective view showing the lower side of the vehicle body rear structure shown in FIG. 1, which is viewed from the side.

FIGS. 1 and 2 are perspective views of a vehicle body rear part 1 of an automobile, which is viewed from the lower side (bottom side) of a vehicle body. As shown in FIGS. 1 and 2, between a pair of rear side members 2 extending substantially along the body longitudinal direction on both sides, right and left, of the vehicle body rear part 1, a cross member 4 is installed so as to extend substantially along the vehicle width direction at a location in front of a back panel 3 (refer to FIG. 3) disposed at the rear end of a vehicle body. A rear floor panel 5 is provided above the paired rear side members 2 and the cross member 4, and the rear floor panel 5 is provided with a spare tire house (spare tire housing) 6 consisting of a bottomed cylindrical concave portion formed by being bent at a location between the cross member 4 and the back panel 3.

Figure 3:
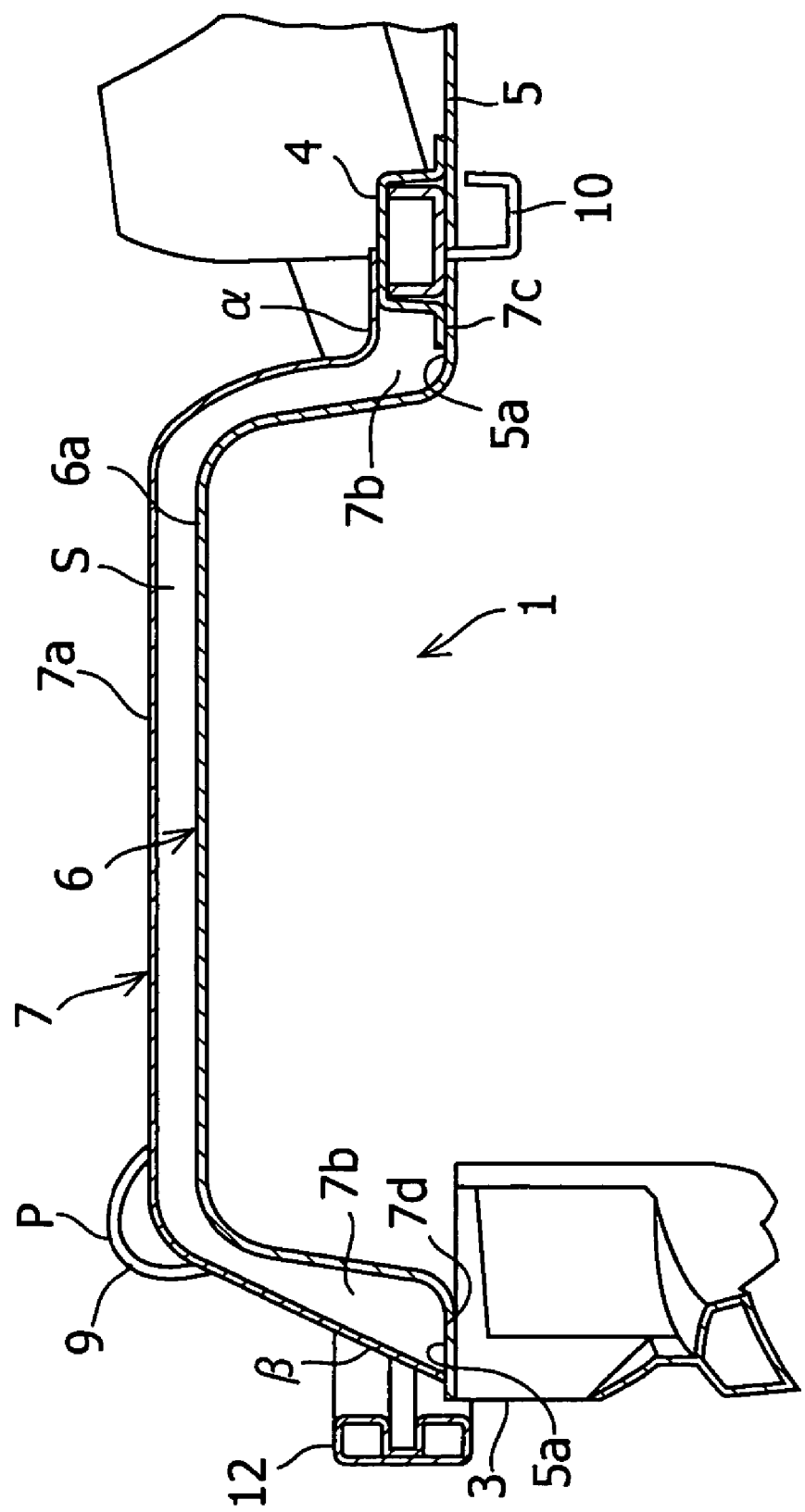
FIG. 3 is an enlarged sectional view taken along the line X-X of FIG. 2.

Also, as shown in FIGS. 1, 2 and 3, an elongate load distributing member 7, which extends along the body longitudinal direction so as to trail over the lower surface (surface on the lower side of the rear floor panel 5) 6a of the spare tire house 6, is assembled to the spare tire house 6. This distributing member 7, which is a member having a body portion formed by being bent into a U shape in cross section perpendicular to the longitudinal direction, has a base portion 7a and a pair of opposed side portions 7b formed by bending both side parts of the base portion 7a, and is configured so that a portion facing the lower surface 6a of the spare tire house 6 is open. Thus, a front end portion α of the load distributing member 7 is joined to a central portion M in the vehicle width direction of the cross member 4, for example, by welding or other means, and a rear end portion β of the load distributing member 7 is joined to a central portion N in the vehicle width direction of the back panel 3 (the back panel 3 located at the rear of the cross member 4) disposed on the rear end sides of the paired rear side members 2, for example, by welding or other means. More specifically, as shown in FIG. 3, the front end portion α is joined to the cross member 4, for example, by welding in a state in which an upper end face 7c of the paired right and left opposed side portions 7b in the front end portion α is in contact with a lower surface 5a of the rear floor panel 5, and also the rear end portion β is joined to the back panel 3, for example, by welding in a state in which an upper end face 7d of the paired right and left opposed side portions 7b in the rear end portion β is in contact with a lower surface 5a of the rear floor panel 5. Further, a pair of flanges 8 (refer to FIGS. 1 and 2) formed on both sides of a body portion of the distributing member 7 are joined to the rear floor panel 5, the spare tire house 6, the back panel 3, and the cross member 4, for example, by welding.

In this embodiment, the spare tire house 6 is provided at a location shifting slightly to the right from the center position in the vehicle width direction of the rear floor panel 5. The load distributing member 7 is not arranged so as to trail along the diameter of the spare tire house 6 on the lower surface 6a of the spare tire house 6, but is arranged so as to extend substantially along the body longitudinal direction at a position shifting slightly in the vehicle width direction from the diameter of the spare tire house 6. By the lower surface 6a of the spare tire house 6 and the load distributing member 7 having a U shape in cross section, a closed cross-sectional shape portion S is formed (refer to FIG. 3).

As shown in FIG. 3, a towing hook 9 is installed in a corner part on the rear end side of the load distributing member 7. This towing hook 9 is regarded as a jack-up point P. Specifically, in this embodiment, the towing hook 9 is also used as the jack-up point P. Also, as shown in FIG. 3, a seat belt anchor 10 is fixed in an upper surface part of the cross member 4. In FIGS. 1 to 3, reference numeral 11 denotes a spring bracket used for a suspension mechanism, and 12 denotes a rear bumper beam.

According to the vehicle body rear structure constructed as described above, since the rear floor panel 5, the back panel 3, and the cross member 4 near the spare tire house 6 are joined to each other, the operation and effects described below can be achieved.

Figure 4:
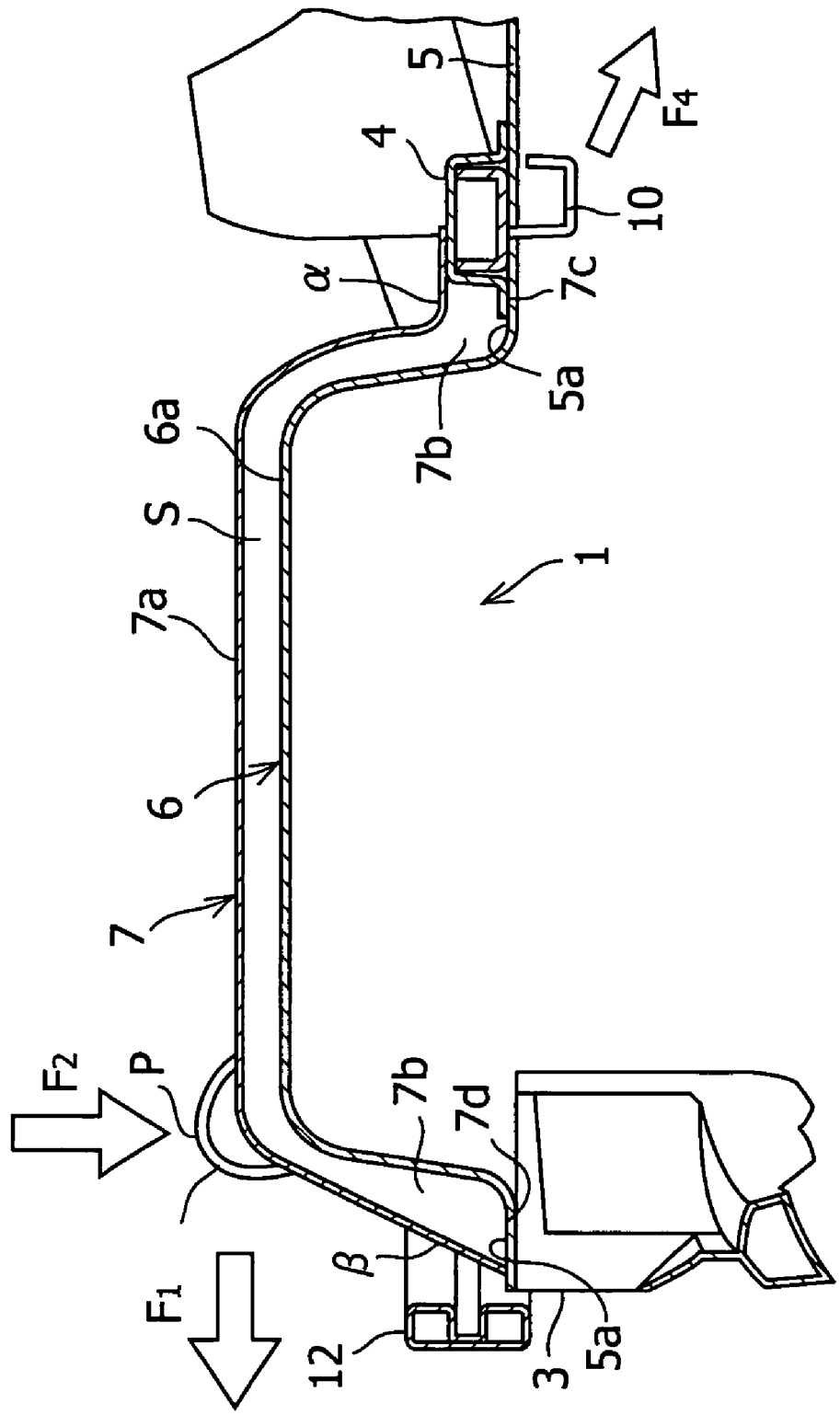
FIG. 4 is a sectional view, similar to FIG. 3, for illustrating loads applied to a towing hook and a jack-up point and a load applied to a seat belt anchor.

First, since the load distributing member 7 is arranged so as to extend from the spare tire house 6 to the rear floor panel 5, when the towing hook 9 is jacked up by a jack, not shown, a load applied to the jack-up point P (a load $F_1$ directed toward the rear of vehicle body as indicated by an arrow in FIG. 4) can be distributed over a wide range from the spare tire house 6 to the rear floor panel 5, the cross member 4, and the rear side members 2, not merely to the load distributing member 7. Also, if a towing load (a load $F_2$ directed upward as indicated by an arrow in FIG. 4) is applied to the towing hook 9, as in the above-described case, the load can be distributed over a wide range from the spare tire house 6 to the rear floor panel 5, the cross member 4, and the rear side members 2, not merely to the load distributing member 7. Therefore, according to the vehicle body structure of this embodiment, the towing hook 9 and the jack-up point P can be secured. Also, since the towing hook 9 is also used as the jack-up point P, a patch for a jack-up point can be omitted, and hence a simple construction that does not bring about an increase in the number of parts and an increase in weight of vehicle body can be realized.

Figure 5:
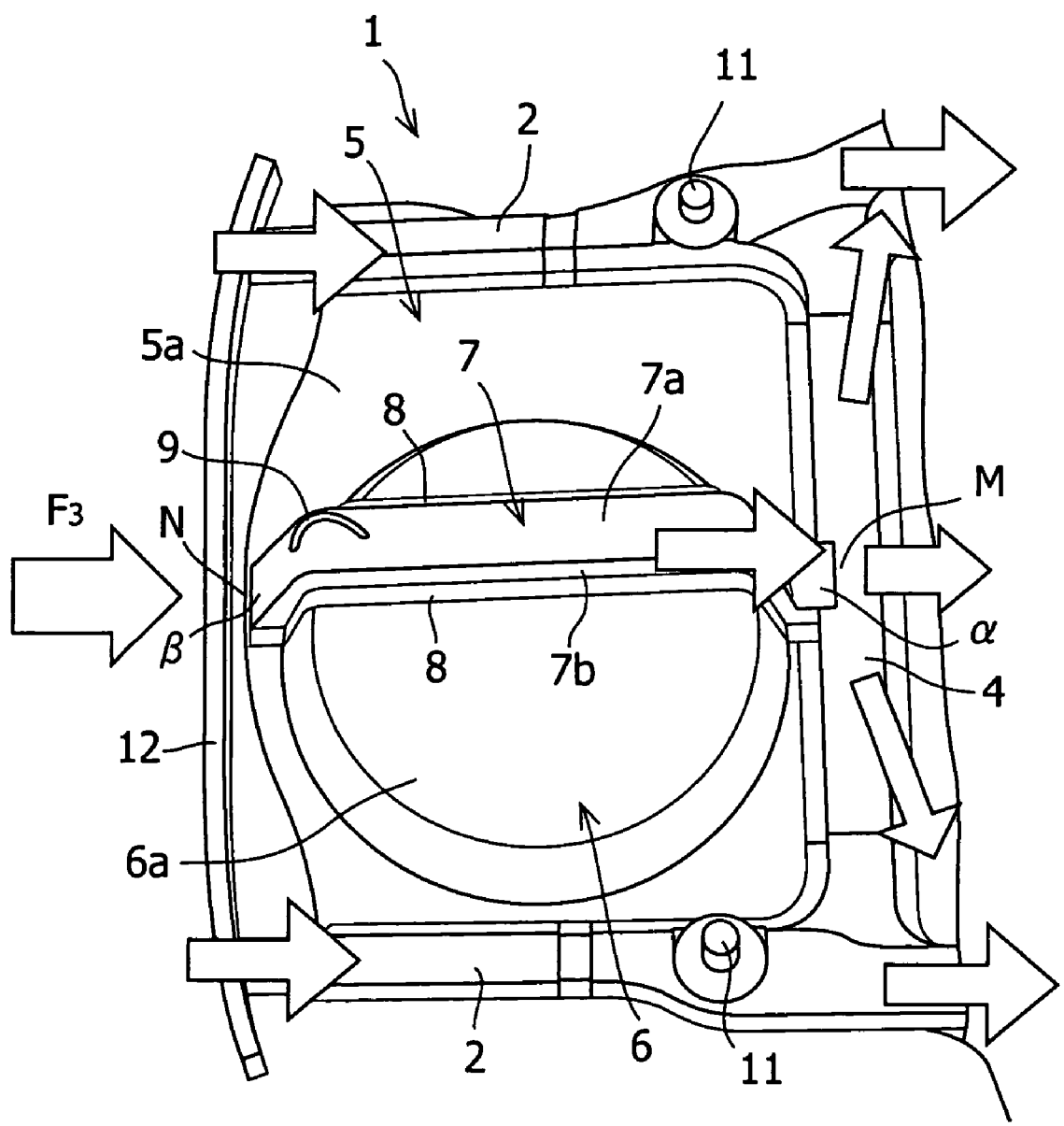
FIG. 5 is a perspective view, similar to FIG. 2, for illustrating a transmission flow (load distribution state) of a load acting from a vehicle body rear part.

For a load from the rear of vehicle body (a load $F_3$ directed toward the front of vehicle body as indicated by an arrow in FIG. 5), load flow from the rear bumper beam 12 to the cross member 4 is distributed to the spare tire house 6 in addition to the rear side members 2 as indicated by arrows in FIG. 5, so that the burden imposed on the rear side members 2 is reduced. Moreover, the load acting on the cross member 4 is carried by not only both right and left end portions of the cross member 4 but also a portion near the central portion M, and hence the load is transmitted to a front vehicle body structure portion in a wide span of the whole of the cross member 4. Therefore, a state in which the whole of the cross member 4 pushes the front vehicle body structure portion (front side members and front panel) is formed, and hence the load from the rear of vehicle body is distributed to the whole of floor panel, so that local concentration of load can accordingly be reduced.

Also, a load from the seat belt anchor 10 fixed to the cross member 4 (a load $F_4$ directed slantwise upward as indicated by an arrow in FIG. 4) is first transmitted to the cross member 4. Then, the transmitted load is sustained by the load distributing member 7 in addition to the paired right and left rear side members 2. Therefore, the load from the seat belt anchor 10 can be distributed properly over the whole of the vehicle body rear part 1. Since not only the load distributing member 7 is connected to the spare tire house 6 but also the rear end portion β thereof is joined to the rear floor panel 5 and the back panel 3 as described above, the load from the rear of vehicle body can be transmitted without imposing a burden on the spare tire house 6 and the rear floor panel 5.

Thereupon, according to the vehicle body rear structure of this embodiment, despite the simple construction that does not bring about an increase in the number of parts and an increase in weight of vehicle body, the structure can deal with all loads including the load from the towing hook 9, the load from the jack-up point P, the load from the rear of vehicle body, and the load from a seat belt anchor 10.

The above is a description of one embodiment of the present invention. The present invention is not limited to this embodiment, and various modifications and changes can be made based on the technical concept of the present invention. For example, although the towing hook 9 is also used as the jack-up point P in the above-described embodiment, the configuration may be such that a patch for jack-up point is installed at an appropriate location of the load distributing member 7 separately from and independently of the towing hook 9, and this patch is used as a jack-up point. Also, the back panel 3 that connects the rear end portion β of the load distributing member 7 may be any member (for example, a vehicle rear end member such as a rear bumper member or a rear bumper bracket) that is located at the rear of the cross member 4.

The invention claimed is:

1. A vehicle body rear structure of an automobile, comprising a pair of rear side members extending substantially along the body longitudinal direction on both right and left sides of a vehicle body rear part; a back panel disposed on the rear end side of the paired rear side members; a cross member installed between the paired rear side members at a location in front of the back panel; a spare tire house bendedly formed on a rear floor panel at a location between the cross member and the back panel, wherein a load distributing member extending along the body longitudinal direction is assembled to the spare tire house so as to trail over a lower surface of the spare tire house; and a front end portion of the load distributing member is joined to the cross member, and a rear end portion thereof is joined to the back panel.

2. The vehicle body rear structure of an automobile according to claim 1, wherein the front and rear end portions of the load distributing member are connected to the rear floor panel.

3. The vehicle body rear structure of an automobile according to claim 1, wherein a towing hook is installed on the load distributing member.

4. The vehicle body rear structure of an automobile according to claim 3, wherein a jack-up point is provided on the load distributing member.

5. The vehicle body rear structure of an automobile according to claim 4, wherein the towing hook is also used as the jack-up point.

6. The vehicle body rear structure of an automobile according to claim 2, wherein a towing hook is installed on the load distributing member.

* * * * *